A. A. TIRRILL.
CONNECTING LINK.
APPLICATION FILED APR. 20, 1920.

1,436,786. Patented Nov. 28, 1922.

INVENTOR
Allen A. Tirrill.
by William B. Wharton
his attorney.

Patented Nov. 28, 1922.

1,436,786

UNITED STATES PATENT OFFICE.

ALLEN A. TIRRILL, OF PITTSBURGH, PENNSYLVANIA.

CONNECTING LINK.

Application filed April 20, 1920. Serial No. 375,331.

*To all whom it may concern:*

Be it known that I, ALLEN A. TIRRILL, a citizen of the United States, and resident of Pittsburgh, in the county of Allegheny and State of Pennsylvania, have invented a new and useful Improvement in a Connecting Link, of which the following is a specification.

This invention relates to a connecting link which is suitable for all general uses in which an attachment is made to a chain link or two chain links are to be mutually attached; but which is particularly adapted for use as a replacement or attaching link in automobile tire chains.

One object of the invention is to provide a connecting link which may be readily attached to chain links, and which cannot be pulled or shaken loose after its attachment.

Another object of the invention is to provide a connecting link which will retain chain links irrespective of the degree to which they have become worn by use, and which is itself resistant to wear and breakage.

Another object of the invention is to provide a connecting link having the above noted advantages, which is simple in form and inexpensive to manufacture.

Figure 3:
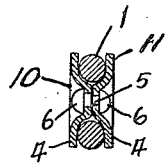
Figure 5:
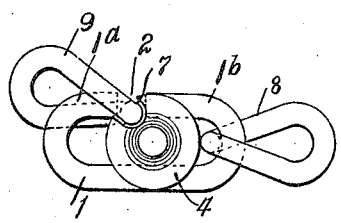
Figure 6:
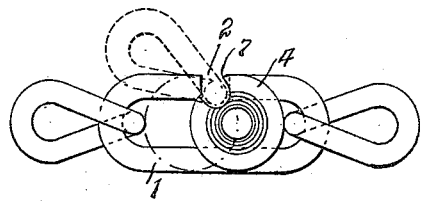
Figure 2:
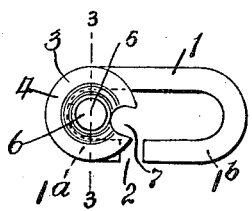
Figure 4:
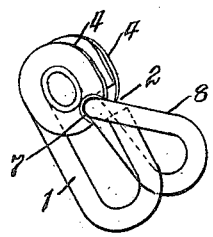
Figure 1:
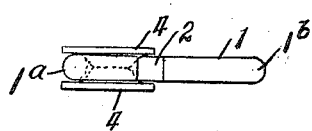

In the accompanying drawings Fig. 1 is a side elevation of the connecting link; Fig. 2 is a plan view thereof; Fig. 3 is a cross sectional view on the line 3—3, Fig. 2; Fig. 4 is a perspective view of the connecting link illustrating the position of the tumblers in attaching the connecting link to or detaching it from a chain; Fig. 5 is a plan view illustrating the use of the link for interconnecting two chains; and Fig. 6 is a plan view of a slightly modified form of the device.

The connecting link comprises a link or body member 1, which is formed of stiff wire or the like bent upon itself to form an elongated loop, and having therein a space or opening 2. Freely movable longitudinally of the link or body member 1 is a double tumbler lock 3, which comprises a pair of tumbler plates or disks 4 joined by a short rivet 5 having heads 6. The tumbler plates are loosely mounted upon their connecting rivet so that they are readily rotatable in the same or in opposite directions thereon; and each plate is provided with a notch 7 arranged to receive a chain link in attaching the connecting link thereto or detaching it therefrom.

To mutually attach the connecting link and a chain link, the notches 7 of both tumblers are brought into register with each other and with the opening 2 in the body member. The chain link to be secured is then inserted into the registering notches and both tumbler plates are rotated until the chain link lies in the space within the body member. The tumbler plates are then rotated (preferably in opposite directions) to lock the chain link within the body member 1.

In the form of the device illustrated in Figs. 1 to 5 of the drawings, the opening 2 in the link or body member is shown as placed to one side of the transverse central line of such member. This is in order that the connecting link may be used for the attachment of one chain as well as for the connection of two chains. If one chain only is attached, the tumbler lock 3 is placed in the short bend $1_a$ of the body member before the notches 7 of the tumblers are brought into register with each other and with the opening 2. The chain link 8 is thus introduced into the long bend $1_b$ of the link, and is prevented from escaping by the tumbler lock 3 which wholly or partially closes the opening 2.

If two chain links are to be connected, the tumbler lock is in such case also first brought into the short bend $1_a$ of the connecting link and a link of one chain introduced into the long bend $1_b$ of the body member. After the introduction of this link, the tumbler lock is moved into the long bend $1_b$, bearing against the chain link 8 therein, and the notches 7 are again brought into register with the opening 2 to permit the introduction of the second chain link into the short bend $1_a$ of the body member. When the device is used thus for the connection of two chains, the link 8 lying in the long bend $1_b$ of the body member prevents the tumbler lock 3 from moving so far therealong as to permit the chain link 9, lying within the short bend $1_a$, from being accidentally withdrawn through the opening.

In order to disengage the connecting link and a chain link, the notches 7 are brought into register with each other, within the space inside of the body or link member 1, and the chain link caused to enter the notches. The tumbler lock is then moved to bring the notches 6 embracing the chain link into register with the opening 2 in which position the chain link may be readily removed through the opening. In the event that the body member is used to connect two chains, the chain link 9 lying within the short bend 1$^a$ is first withdrawn, and the lock 3 is then shifted for the withdrawal of the chain link 8 lying within the long bend 1$_b$.

In the modification of the device illustrated in Fig. 6 of the drawings, the opening 2 lies on the transverse central line of the link or body member 1. This modification is intended only for the connection of two chains. In the use of this form of the device a chain link lies in each bend of the body member with the tumbler lock 3 between them. Each of the chain links thus prevents the tumbler lock 3 from being shifted so far in either direction along the body member as to expose the opening 2 and permit accidental withdrawal of the other link.

When intended for use as an attaching or repair link in automobile tire chains, the link member 1 and tumbler plates 4 are preferably tempered before assembling the parts of the device. As this is not possible in the case of the rivet heads 6, it is necessary that they be protected from wear in order to increase their life under long continued use. This is effected by so cupping the tumbler plates 4 that the rivet heads 6 lie within a depression 10 and are protected by the rims 11 of the plates. If so desired, however, the tumbler plates 4 may obviously be made flat and other suitable means be provided for protecting the rivet heads.

It has been found that devices previously employed for repairing automobile tire chains, have presented the great disadvantage that they were extremely apt to become wholly or partially unfastened under the severe agitation to which such chains are subjected in use. If wholly unfastened the repair link is lost; while if partially unfastened, the arms of the repair link cut into and severely injure the tire to which the chain is attached. When used as a repair link, the device of the present invention completely obviates such difficulties.

As the device is susceptible of a number of modifications without departing from the spirit of the invention, no limitations, other than those contained in the appended claims, are to be imposed. As examples of such modifications: one tumbler plate may be used and a second member of relatively small diameter may be employed to engage with the link or body member, to secure the single tumbler plate in position without interfering with the insertion or removal of a chain link. As a further possible modification, more than two tumbler plates may obviously be employed if so desired.

What I claim is:

1. The combination with an elongated link having an opening in one of its long sides forming an entrance and exit passage, of a lock member rotatably confined within the link and freely movable lengthwise thereof across said opening and provided with a notch arranged to co-operate with said opening for controlling passage therethrough.

2. A device according to claim 1 in which the lock member is formed of two disks, each of which is provided with a notch in its periphery.

3. A device according to claim 1, in which the lock member is formed in the nature of two disks of greater diameter than the distance between the long sides of said link.

4. A device according to claim 1, in which the opening in the link is on one side of its transverse center.

5. A device according to claim 1, in which the lock member comprises relatively rotatable tumblers each provided with a peripheral notch.

6. A device according to claim 1, in which the lock comprises dished tumblers riveted together but free to rotate independently.

7. The combination with two chain links, of a connecting link intermediate said chain links and linked thereto and comprising an elongated link having an opening in one of its long sides and a lock member rotatably confined within the connecting link and freely movable toward said chain links and provided with a notch for co-operation with said connecting link opening to permit the removal of said chain links from said connecting link.

In witness whereof, I hereunto set my hand.

ALLEN A. TIRRILL.

Witnesses:
J. M. HOLLIDAY,
E. A. BECKER.